Figure 1:
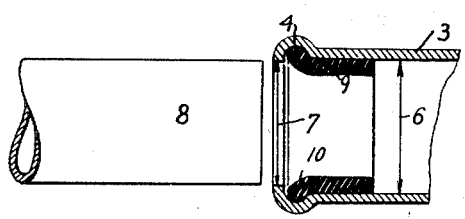

May 2, 1950     G. KEECH     2,505,863

COUPLING MEANS

Filed Oct. 14, 1946

INVENTOR
G. KEECH
BY
Searcock Downing & Seibold
ATTYS.

Patented May 2, 1950

2,505,863

UNITED STATES PATENT OFFICE 2,505,863

COUPLING MEANS

Gordon Keech, Clifton Gardens, near Sydney, New South Wales, Australia, assignor to Keeseal Pty. Limited, Mascot, near Sydney, New South Wales, Australia, a company of New South Wales, Australia Application October 14, 1946, Serial No. 703,252
In Australia November 19, 1945

2 Claims. (Cl. 285—193)

This invention relates to coupling means wherein male and female members are held together and a joint is made by a sleeve of resilient material such as rubber, natural or synthetic, interposed between the male and female members.

Heretofore in one type of these couplings where two pipes are joined in a coupling member by sleeves of resilient material interposed between the pipes and the coupling member it has been necessary to flare the ends of the coupling member or to bevel or taper the ends of the pipes to provide a lead in for the pipes. Also many types of couplings have been evolved employing rubber rings, gaskets and the like interposed between male and female members constructed with spigot and socket ends respectively, with the object of effecting a seal between such members and/or to assist in maintaining the coupling.

These couplings insofar as they have depended upon the rubber insert, have not been, comparatively, of an order to withstand high stresses and strains such as are generally required of screwed unions. Moreover with the latter type of coupling referred to a special construction of pipe ends, or one of them is required which makes such couplings impracticable for general use where pipes have to be cut to various lengths.

The present invention has been devised to provide a simple coupling for pipes having plain ends. The coupling will create a tenacious joint by forming a compressive lock on the pipes capable of withstanding high withdrawing and/or torsional pressures of the order of 1000 lbs. per square inch or more without anchoring the members to be held by the coupling in any other manner whatsoever. The pressure of the compressive lock on the pipes increases proportionately with any withdrawing pressure or force applied to the coupling.

A feature of the invention is that the pipe ends do not have to be prepared in any way in order to make a coupling. The advantage of this feature is that pipes to be joined can be cut to the lengths required and the coupling quickly and easily effected. Nevertheless a slight bevel formed on the pipe ends facilitates mating the respective parts.

The coupling means of this invention is a tubular member which for joining two pipes has an internal groove near the outer ends thereof. The diameter of this tubular member at the outer ends of the grooves, that is, at the ends of the tubular member is such as to provide a working clearance over the pipes to be joined while the diameter of the tubular member internally of the grooves is enlarged to accommodate a rubber or like sleeve inserted at each end. The outer ends of the sleeves are accommodated in the respective grooves. It is desirable for the depth of the internal grooves to be slightly greater than the thickness of these sleeves.

Each rubber or like sleeve before compression between the members of the coupling as will be explained should have a wall thickness exceeding half but not exceeding twice the differential between the major internal diameter of the tubular member (not the groove) and the external diameter of the pipe to be joined. It is preferred that the wall thickness of the sleeve be equal to the differential between the major internal diameter of the tubular member and the external diameter of the pipe. The wall thickness of the sleeve is an important factor in making the coupling. The internal diameter of the sleeve should be approximately the same as the external diameter of the pipe. The length of the sleeve can be easily determined. For most purposes a satisfactory coupling can be made with a sleeve the length of which is equal to half its diameter.

To join the pipes two rubber sleeves are inserted into the coupling member to such positions that the outer ends fill the mentioned grooves. Then by reason of the size of the respective parts the ends of the sleeves will expand into the grooves and thus constitute a flared entry for the pipes.

A lubricant is applied to the internal wall of the sleeves and/or to the pipes to be inserted therein. The lubricant must be one that will be dissipated as by extrusion when the coupling is completed or before operative pressure is applied to the coupling. A light vegetable oil has been found effective.

After the lubricant has been applied the pipes are forced into the sleeves positioned in the coupling member by any appropriate lever means. The confluence of the inner edges of the grooves and the pipes forms loci of initial anchorage for the sleeves the outer ends of which are in the grooves and are thus held during the movement of the pipes into the sleeves. This movement compresses the sleeves and expands them longitudinally and compacts the outer ends into the internal grooves. Any attempt to withdraw the pipes either by internal pressure or external force after the lubricant has dissipated results in the wedging of part of the sleeves in the respective grooves and against the pipes assisted by the reduced diameter of the ends of the coupling member. This wedging action causes the sleeves to form a compressive lock on the pipes and the parts cannot be separated without distorting the pipes or the coupling member or by destruction of the rubber sleeves.

Figure 2:
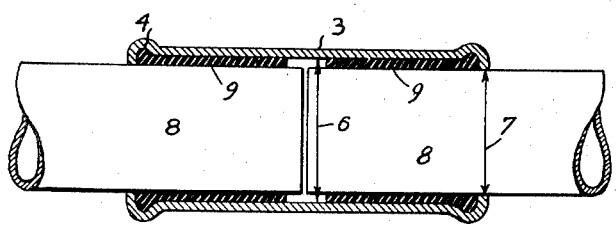
Figure 3:
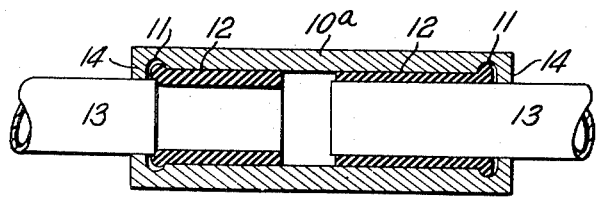

The invention is illustrated in the annexed drawing wherein Fig. 1 shows one end of a coupling in longitudinal section with a pipe positioned to be entered therein, Figure 2 shows a double end coupling in longitudinal section with two pipes positioned therein and Fig. 3 illustrates a modified form of the double end coupling of Fig. 2 as applied to pipes of heavier gauge.

The coupling member 3 (Fig. 1) has an internal groove 4. Inwardly from the groove the internal diameter of the coupling member as indicated at 6 is greater than the diameter at the end 7. The end 7 forms an internal shoulder which is a working clearance on the pipe 8. It will be appreciated that this coupling member 3 may be a part of a fixture to which a pipe is to be coupled or it may be part of a bend or T or like pipe coupling unit having an end or ends the same as that shown.

The rubber sleeve 9 made to the size described above is inserted in the coupling member and the end of said sleeve entering the groove 4 forms a flared or bellmouth entry as indicated at 10 while the confluence of the inner edges of the grooves and the pipes form the loci of initial anchorage for the sleeves as stated above. A lubricant is applied to the internal wall of the rubber sleeve and/or to the end part of the pipe 8 which is then forced into position.

Fig. 2 shows a double end coupling for joining two pipes in axial alignment and it shows the pipes in position. The reference numerals in this figure indicate the same parts as in Fig. 1. It will be seen that when the pipes are inserted the rubber sleeve is expanded longitudinally. This expansion in the outward direction fills and compacts the rubber into the grooves 4 and by reason of the internal shoulder at the end of the coupling member the rubber forms a wedging compressive lock on the pipes 8.

Figure 3 illustrates a coupling similar to Figure 2 in which the double end coupling member 10ª is a tubular member of heavier gauge. A pipe 13 is shown on the left hand side of this figure before insertion into the member 10ª and the right hand side of this figure illustrates the pipe in its inserted and coupled condition. As clearly shown, the resilient sleeve 12 has one end lying in the groove 11 of the tubular member 10ª and the numeral 14 denotes the flange or shoulder that extends inwardly of the coupling member 10ª so that the opening defined thereby and through which the pipe 13 is entered has a diameter less than the inner diameter of the coupling member 10ª inwardly of the groove 11. It is clear from this figure that the resilient sleeve 12 has a wall thickness before coupling takes place greater than the space between the outer surface of the pipe 13 and the inner surface of the coupling member 10ª inwardly of the groove. The coupling action of the form illustrated in Figure 3 is the same as that of Figure 2.

I claim:

1. A pipe coupling consisting of a tubular member having an internal groove adjacent the end thereof, the diameter of the tubular member at the outer end of the groove being smaller than the diameter of the tubular member at the inner end of the groove, a resilient sleeve in said tubular member with one end slidably entered into said groove, a pipe entered into said resilient sleeve, said resilient sleeve having a wall thickness before coupling takes place exceeding half but not exceeding twice the differential between the pipe and the diameter of the tubular member inwardly of the groove and said resilient sleeve being axially elongated in both directions to prevent withdrawal of said pipe from said member with the end of said sleeve entered into said groove constituting a wedge forming portion to further elongate axially and fill said groove under withdrawing force exerted on said pipe.

2. A pipe coupling consisting of a tubular member having an internal groove adjacent the end thereof, an internal shoulder at the outer end of said internal groove defining an opening of less diameter than the diameter of the tubular member inwardly of the groove the reduced diameter provided by said shoulder being such as to provide a working clearance for a pipe to enter the tubular member, the diameter of the tubular member inwardly of said groove being such as to accommodate a resilient sleeve, a resilient sleeve compressed between the tubular member and the pipe and having one end entered into said groove and having a wall thickness before coupling takes place greater than the space between the pipe and the inner surface of the tubular member inwardly of the groove characterised in that the confluence of the inner edge of the groove and the pipe, forms a loci of initial anchorage for the resilient sleeve during the movement of the pipe into the tubular member and further characterised in that a withdrawing action exerted on the pipe compacts the resilient sleeve in the groove and against the pipe in the form of a wedge to prevent withdrawal of the pipe.

GORDON KEECH.

REFERENCES CITED

The following references are of record in the file of this patent:

UNITED STATES PATENTS

| Number | Name | Date |
|---|---|---|
| 566,470 | Ricketts | Aug. 25, 1896 |
| 1,945,293 | Pierce | Jan. 30, 1934 |
| 1,985,325 | Nathan | Dec. 25, 1934 |
| 2,272,900 | Saurer | Feb. 10, 1942 |